(12) United States Patent
Pargaonkar et al.

(10) Patent No.: US 11,095,573 B2
(45) Date of Patent: Aug. 17, 2021

(54) RECOMMENDATION ENGINE FOR RESOURCE TAGGING

(71) Applicant: MICRO FOCUS LLC, Santa Clara, CA (US)

(72) Inventors: Vishwanath Pargaonkar, Bangalore (IN); Jaspreet Singh, Bangalore (IN); Chilakam Prathapa Reddy, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 16/706,133

(22) Filed: Dec. 6, 2019

(65) Prior Publication Data

US 2021/0176191 A1 Jun. 10, 2021

(51) Int. Cl.
*H04L 29/12* (2006.01)
*H04L 12/911* (2013.01)
*G06N 5/04* (2006.01)
*G06N 20/00* (2019.01)
*G06F 16/25* (2019.01)

(52) U.S. Cl.
CPC ............ *H04L 47/82* (2013.01); *G06F 16/252* (2019.01); *G06N 5/04* (2013.01); *G06N 20/00* (2019.01); *H04L 61/1541* (2013.01); *H04L 61/1582* (2013.01); *H04L 61/30* (2013.01); *H04L 61/3015* (2013.01)

(58) Field of Classification Search
CPC . H04L 61/1541; H04L 61/1582; H04L 61/30; H04L 61/3015; H04L 47/82; H04L 41/0893; H04L 41/5048; H04L 63/0263; G06F 16/252; G06F 16/1734; G06F 16/38; G06F 11/1464; G06F 9/5011; G06N 5/04; G06N 5/022; G06N 20/00; A63F 13/79; G05B 19/042; G06Q 10/00; G09B 5/06; H04W 72/0493

See application file for complete search history.

(56) References Cited

U.S. PATENT DOCUMENTS

| | | | |
|---|---|---|---|
| 9,787,598 B2 | 10/2017 | Bertram et al. | |
| 10,187,325 B2 | 1/2019 | Foskett et al. | |
| 10,331,467 B2 | 6/2019 | Parikh et al. | |
| 2012/0150859 A1* | 6/2012 | Hu | G06Q 10/00 707/737 |
| 2013/0159323 A1* | 6/2013 | Hua | G06F 16/38 707/749 |

(Continued)

FOREIGN PATENT DOCUMENTS

CN      103605784      2/2014

OTHER PUBLICATIONS

Automatic tag recommendation algorithms for social recommender systems; Yang Song et al.; 35 pages; 2016, Sep. 2008.

(Continued)

*Primary Examiner* — Le H Luu (57) ABSTRACT

A resource recommendation system is described to recommend and standardize resource tagging in a networked computing environment. In one example, cloud resources and related data are discovered, a database of the discovered information is generated, machine learning is applied to the database to build a prediction model, and tags for the resources are recommended, based on the prediction model, at a computing device.

20 Claims, 6 Drawing Sheets

(56) References Cited

U.S. PATENT DOCUMENTS

| | | | |
|---|---|---|---|
| 2018/0190135 A1* | 7/2018 | Robichaux | G09B 5/06 |
| 2018/0295202 A1 | 10/2018 | Gulsvig Wood et al. | |
| 2019/0123983 A1* | 4/2019 | Rao | H04L 41/0893 |
| 2019/0171966 A1* | 6/2019 | Rangasamy | G06F 11/1464 |
| 2019/0327144 A1* | 10/2019 | Tembey | H04L 41/5048 |
| 2019/0340945 A1* | 11/2019 | Malhotra | G06N 5/022 |
| 2019/0380092 A1* | 12/2019 | Buck | H04W 72/0493 |
| 2020/0026708 A1* | 1/2020 | Ahn | A63F 13/79 |
| 2020/0099592 A1* | 3/2020 | Mahindru | G06F 16/1734 |
| 2020/0213325 A1* | 7/2020 | Scherman | H04L 63/0263 |
| 2020/0264934 A1* | 8/2020 | Jayaraman | G06F 9/5011 |
| 2020/0310394 A1* | 10/2020 | Wouhaybi | G05B 19/042 |

OTHER PUBLICATIONS

Implemented cloud tagging to simplify automation and administration; Joe Kozlowicz; 8 pages; Mar. 21, 2019.

* cited by examiner

SERVICE DESIGN DATA 400

| Provider | Resource | OS | Database | Application | Tag_OS_DB_Cloud_OnPrem | Tag_App_DB_Resource |
|---|---|---|---|---|---|---|
| VMware | VM | Linux | Oracle | SAP | Linux_gen_Oracle_OnPrem | SAP_app_Oracle_VM |
| Google | VM | Windows | Oracle | SAP | Windows_gen_Oracle_Cloud | SAP_app_Oracle_VM |
| AWS | VM | Linux | RDS | ALM | Linux_gen_RDS_Cloud | ALM_app_RDS_VM |
| AWS | Container | Linux | RDS | HR | Linux_gen_RDS_Cloud | HR_app_RDS_Container |
| Google | Container | Linux | Oracle | CRM | Linux_gen_Oracle_Cloud | CRM_app_Oracle_Container |
| Azure | VM | Windows | Oracle | CRM | Windows_gen_Oracle_Cloud | CRM_app_Oracle_VM |
| VMware | Container | Linux | Oracle | CRM | Linux_gen_Oracle_OnPrem | CRM_app_Oracle_Container |
| AliCloud | VM | Linux | Oracle | HR | Linux_gen_Oracle_Cloud | HR_app_Oracle_VM |

FIG. 4

SUBSCRIPTION REQUEST DATA 500

| Provider | Resource | OS | Database | Application | Consumer | Consumer_Group | Consumer_CostCenter | Purpose | Tag_Group_OnPrem_Cloud | Tag_Purpose_App |
|---|---|---|---|---|---|---|---|---|---|---|
| VMware | VM | Linux | Oracle | SAP | John | Finance | ABC123 | Production | Fin_OnPrem | SAP_Prod |
| Google | VM | Windows | Oracle | SAP | Kofi | Marketing | BD235 | Production | Mar_Cloud | SAP_Prod |
| AWS | VM | Linux | RDS | ALM | Steve | R&D | EFG567 | Dev | RD_OnPrem | ALM_Dev |
| AWS | Container | Linux | RDS | HR | Mike | HR | DX987 | Production | HR_Cloud | HR_Prod |
| AWS | Container | Linux | RDS | HR | Kofi | HR | DX987 | Production | HR_Cloud | HR_Prod |
| Google | Container | Linux | Oracle | CRM | Steve | Finance | ABC123 | Production | Fin_Cloud | CRM_Prod |
| Azure | VM | Windows | Oracle | CRM | Mike | Finance | ABC123 | Production | Fin_Cloud | CRM_Prod |

FIG. 5

User Interface Prompt -- Service Design Level -- Cloud Environment
600

Based on the prediction model, the following tags are recommended to be used with the below referenced design:

1. Linux_general_RDS_Cloud ☑
2. ALM_App_RDS_VM ☑

Amazon Server — Child → Amazon RDS

FIG. 6

User Interface Prompt -- Service Design Level – Multi-Cloud Provider Environment
700

Based on the prediction model, the following tags are recommended to be used with the below referenced design:

1. Linux_general_Oracle_OnPrem ☑
2. Linux_general_AWS_RDS_Cloud ☑
3. CRM_App_Azure_Cloud ☑

VCenter Server — Child → Amazon RDS — Child → Microsoft Azure CRM

FIG. 7

User Interface Prompt – Subscription Request Level
800

Application Servers: SAP Offering
Provision virtual machine with advanced options Based on the prediction model, the following tags are recommended to be used with this subscription:

1. Fin_OnPrem ☑
2. SAP_Prod ☑

Datacenter Configurations

Datacenter
<input data>

Resource Pool

Datastore

FIG. 8

RECOMMENDATION ENGINE FOR RESOURCE TAGGING

BACKGROUND

Cloud computing provides convenient, on-demand, network access to shared pools of configurable computing resources to store, manage, and process data. Resource tagging is a key strategy for tracking resources in cloud computing environments, including multi-cloud, public cloud, private cloud, on-premise cloud, and hybrid cloud. Cloud resources may include networks, servers, data storage, applications, and services. For example, network resources may include virtual routers, bandwidth, virtual firewalls, and network management software. Cloud applications or services may include email, data or file storage, data sharing, order entry, word processing, customer relationship management (CRM), data collection, financial accounting, and many other computing and data storing operations. Example servers may include dedicated hardware servers, hypervisors, virtual machines (VM), or containers.

Resource tagging, or tags, is a form of metadata that cloud customers assign to their cloud resources. Resource tagging is critical to help in identification and tracking of resources, reporting, auditing, automation, configuration management, optimization, compliance, security, and categorization such as by purpose, owner, cost center, user, project, environment, and other criteria. However, it is often difficult to ensure a consistent, global tagging policy across resources, and especially in multi-cloud environments with multiple providers because of a lack of visibility across hosts and services, and because different cloud providers have different tagging limitations and criteria. Inconsistent tagging makes it difficult and almost unmanageable to properly track and manage resources.

DETAILED DESCRIPTION

This document describes example methods, devices, systems, and procedures to recommend and standardize resource tagging in a networked computing environment, including the cloud, multi-cloud, hybrid cloud, public cloud, private cloud, on-premise cloud, and other local or remote shared computing environments, and across multiple providers of these environments. For ease of discussion, these computing environments are jointly referred to herein simply as the cloud, or a cloud environment, or a networked computing environment, unless specifically called out otherwise for a particular understanding or context.

Figure 1:
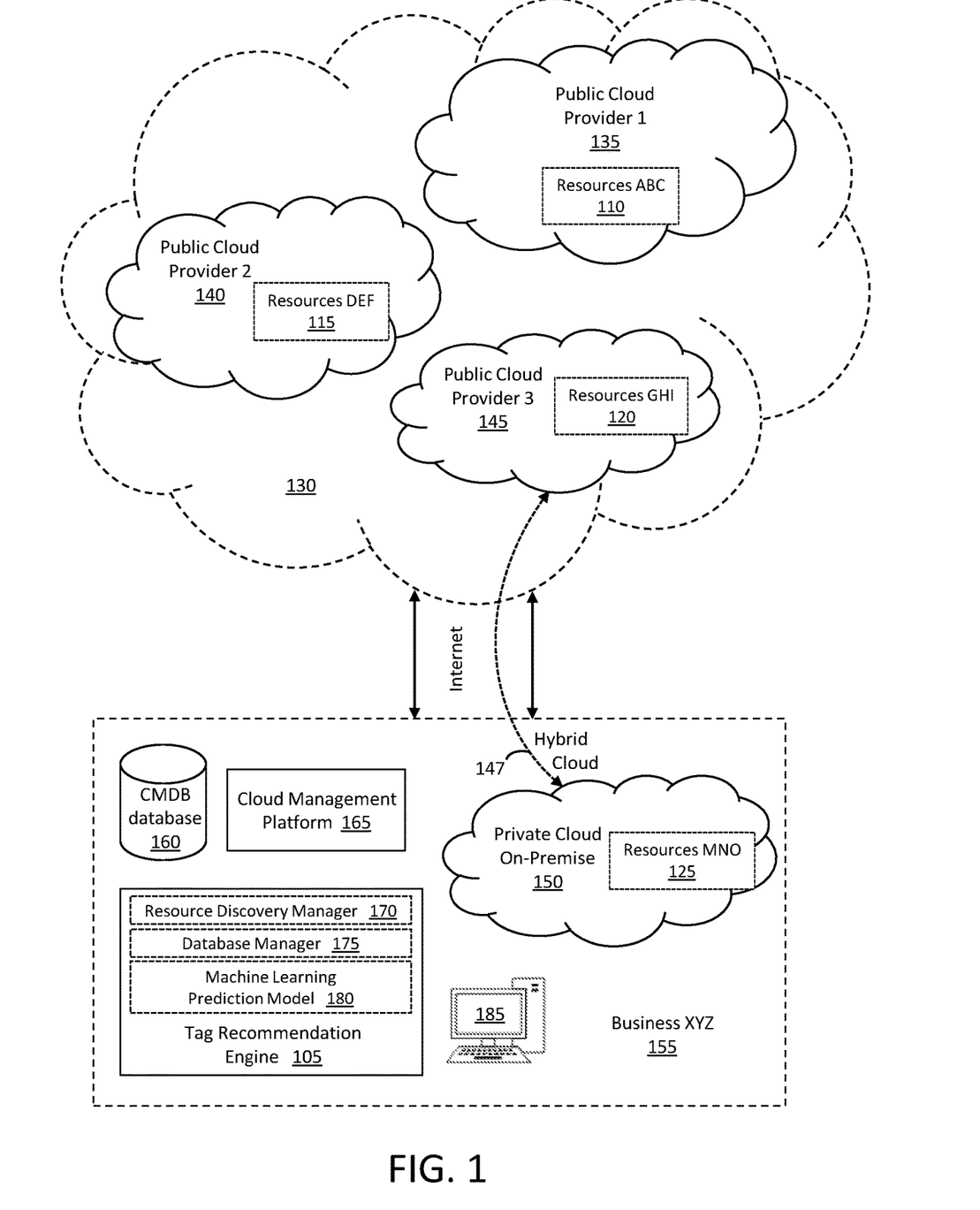
FIG. 1 is a block diagram illustrating an example tag recommendation engine for recommending tags in cloud environments.

FIG. 1 is a block diagram illustrating an example tag recommendation engine 105 for recommending tags and providing consistent tagging strategies to identify and manage cloud resources. Public cloud 130 includes multi-cloud and multi-provider environments 135, 140, 145, and respective cloud resources 110, 115, 120. On-premise private cloud 150 includes resources 125, and hybrid cloud 147 is a coordination of resources between public cloud 145 and private on-premise cloud 150. Although in this example tag recommendation engine 105 is depicted as deployed in a complex cloud scenario of a multi-cloud and hybrid cloud environment, it may also be deployed in a more simple networked computing environment, such as in a single public cloud context, or just the on-premises private cloud context, or just the hybrid cloud context, or even just a single provider context.

In this example, business XYZ 155 uses the tag recommendation engine 105 and hosts a private cloud on-premises 150. Business XYZ 155 also manages a configuration management database (CMDB) 160 that contains all relevant information about the hardware and software components used in its organization's information technology (IT) services and the relationships between those components. Likewise, business XYZ uses a cloud management platform 165 which is a suite of software tools for monitoring and controlling its cloud computing resources. Although the CMDB 160 and cloud management platform 165 are depicted as being hosted within a local network environment of business XYZ 155, or within the business firewall, they may alternatively be hosted in the cloud 130, such as by any one of the depicted cloud Providers 1, 2 or 3 (135, 140, 145), or in a software-as-a-service (SaaS) model.

Tag recommendation engine 105 includes the components of a resource discovery manager 170, database manager 175, and machine learning prediction model 180. Each of these components may be embodied in whole or in part as programming instructions stored on a non-transitory, machine-readable (e.g., computer/processor-readable) medium, such as a random-access memory (RAM) or read-only memory (ROM) for execution on a processor in a computing device or devices, such as computing platform/server 185 (referred to herein as a server 185). In some examples, implementing the operations of these instructions can be achieved by a processor reading and executing the programming instructions stored in the memory. In other examples, implementing the operations can be achieved using an application specific integrated circuit (ASIC) and/or other hardware components alone or in combination with programming instructions (e.g., firmware or software) executable by a processor with server 185. Alternatively, tag recommendation engine 105 may be implemented or serviced in the cloud 130, such as by using a software as a service (SaaS) model.

Tag recommendation engine 105 recommends tags for resources in cloud 130 (including private on-premises cloud 150), to users of the system. This is accomplished first by resource discovery manager 170 discovering data relating to all the resources 110, 115, 120, 125 across the cloud 130, 150 and varying cloud providers 135, 140, 145, 150 as needed. The resource data is collected from CMDB 160, cloud management platform 165, or any other database having relevant resource related information. The resource data includes identification of the resources and other relevant resource and subscription related information.

Resources discovered may include, for example, a hardware device such as a storage device, a software application, a computing system such as a server, a virtual machine, a container, a hypervisor, or combinations thereof. The resource data discovered may include, for example, information relating to identifying each of the resources, existing resource tags, customer service subscriptions for those resources, resources used in the service subscription, user profile data, business profile data, and combinations thereof.

After all the resource data is discovered, then database manager 175 generates a database or tables of information based on the discovered resource data. In one example, the discovered resource data is separated into, or associated into, a plurality of categories or levels for defining a design, implementation, subscription, or other usage of cloud resources. In one example, the resource data is separated into, or associated into, two categories or levels—a service design level and a subscription request level—for the cloud resources. This may be accomplished by associating the service design level information into a first table of data, and the subscription request level information into a second table of data. This categorization enables a more focused tag recommendation model—one for use during the service design phase of building or designating cloud resource options for customer use, and the other for use during the customer subscription request phase as customers choose which resources they prefer to use.

A machine learning prediction model 180 is applied to the database of information to build a prediction model. In one example, a regression technique such as random forest with decision tree may be used to build the model, however any other logistic regression technique may be used. For example, a principal component analysis (PCA) like K-means clustering may also be used. In either case, the model will be multi-label classification as there are multiple target variables at play. The machine learning prediction model 180 is applied to build a prediction model for recommending tags based on the existing discovered resource data. In one example of cloud resource tagging, the prediction model is applied separately to each level of information, e.g., a regression technique is applied to the service design level of information, and the regression technique is applied separately to the subscription request level of information, to identify or predict the best tags based on the existing resource information and level of use. In either case, the prediction model recommends a tag that is standardized relative to tags already associated with the resources across the cloud 130, multiple providers 135, 140, 145, and/or private cloud 150.

The tag recommendation engine 105 recommends at least one tag for the resources at issue based on the prediction model. The recommendation is provided at a context-sensitive user-interface prompt for a user at server 185 or other computing device communicating with the tag recommendation engine 105. This allows the user, whether in the context at the service design level or at the subscription request level, to select a resource tag that is consistent and standardized across the existing cloud resources. Presenting recommended tags at a context-sensitive user-interface prompt helps filter tags based on the user's profile and what the user is currently trying to accomplish.

As an additional element of tag recommendation engine 105, the entire process of discovering resource data, generating and updating the database 175, and applying a machine learning prediction model 180 to the data, is periodically performed (meaning occasionally or continuously as system parameters allow) so that recommending tags for the resources is dynamically updated for consistent, standardized, relevant tagging of the resources at user-interface prompts on server 185. Periodically performing these steps or individual processes, or the entire process, may occur relative to the computing power, environment, and dynamics of the cloud(s) involved. For purposes of this disclosure, periodically performing these steps, or individual processes, or entire process, means performing them at times anywhere on the time spectrum ranging from occasionally to continuously as a design preference and system parameters allow. For example, if sufficient bandwidth and processing power is available, periodically updating may range from every few seconds, or minutes, or hours. Alternatively, periodically updating the resource discovery, updating the tables, and re-applying the machine learning model, may occur daily, or as necessary to meet the business requirements.

Figure 2:
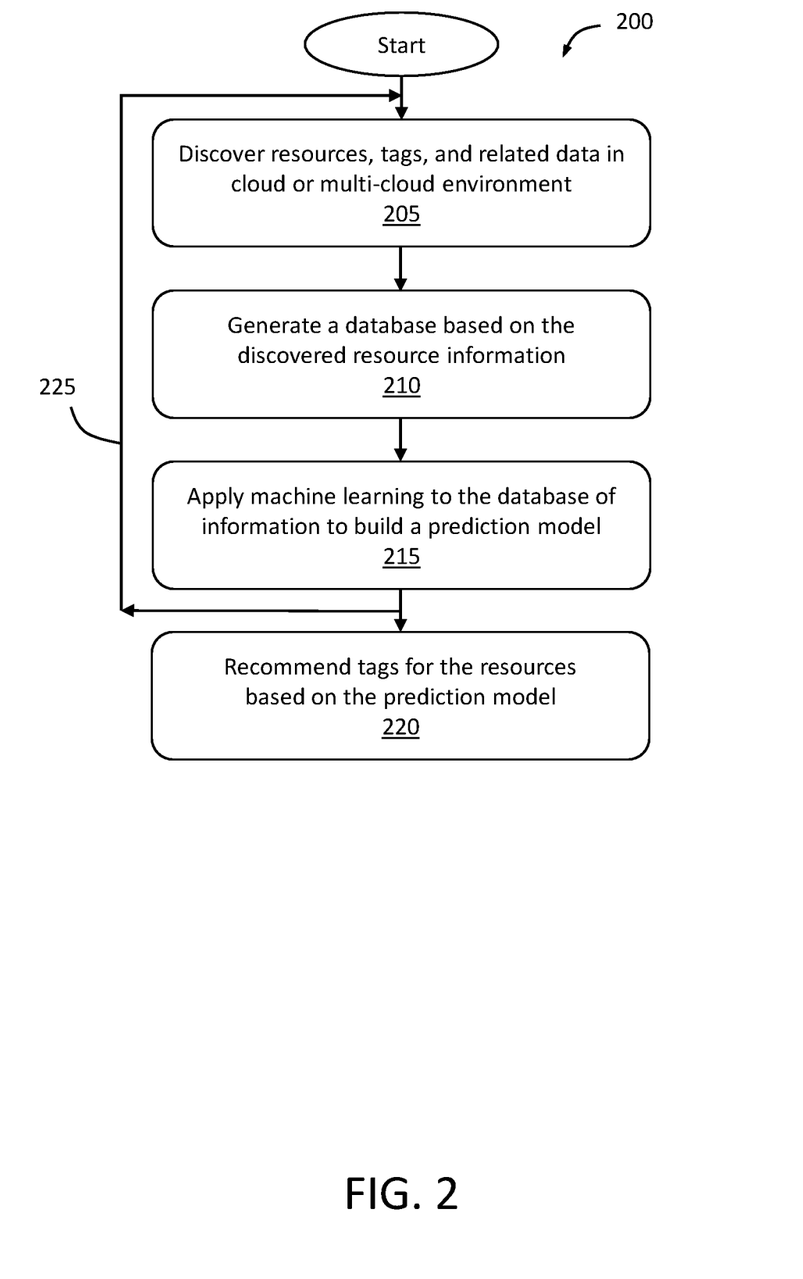
FIGS. 2-3 are flow charts illustrating example methods of deploying a tag recommendation engine.
Figure 3:
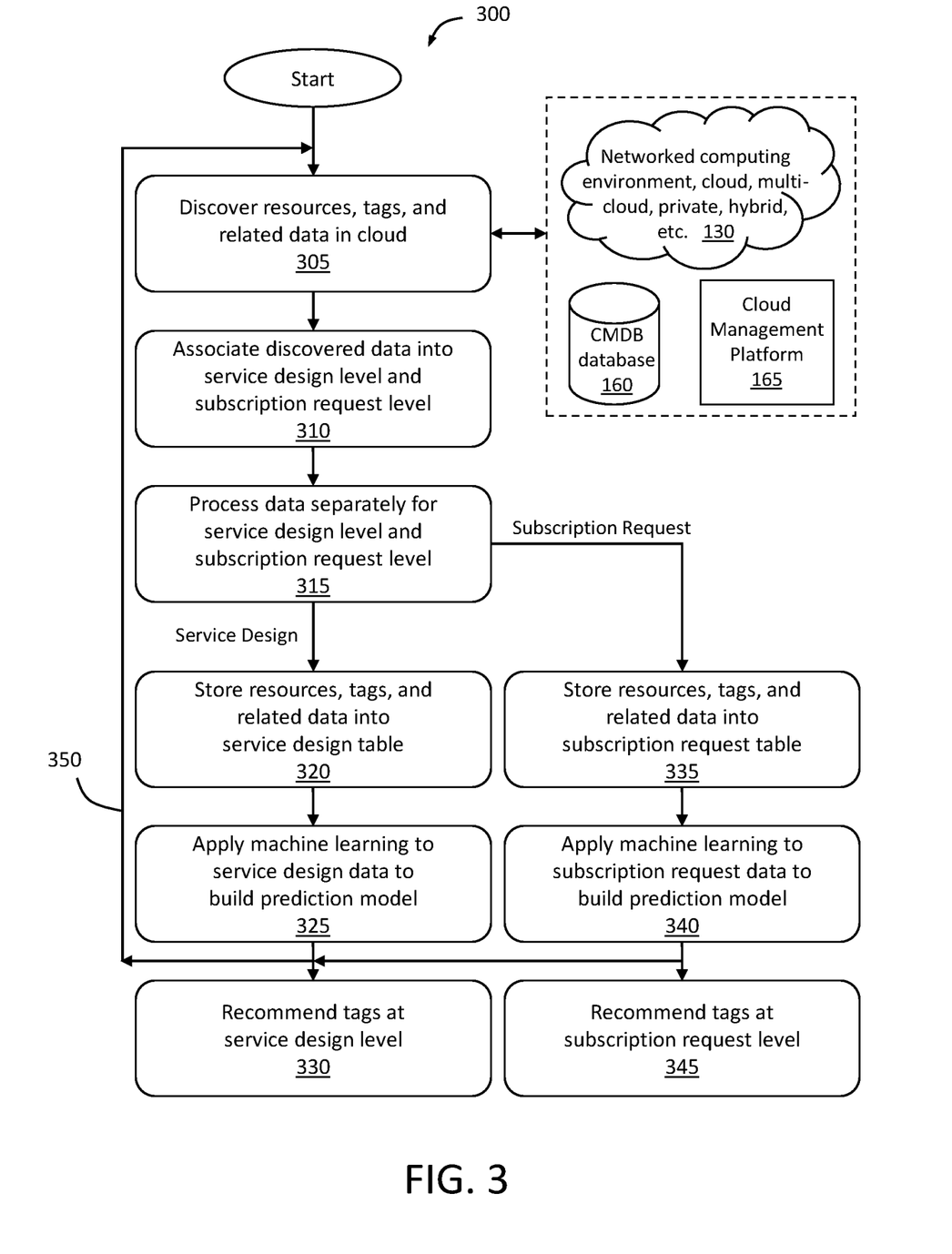

FIGS. 2-3 are flow charts illustrating example methods 200, 300 of a cloud resource tag recommendation engine. The system and/or operations of these methods may be embodied in whole or in part as programming instructions, such as firmware or software, stored on a non-transitory, machine-readable (e.g., computer/processor-readable) medium, such as a RAM or ROM memory for execution on a processor in a computing device or devices. In some examples, implementing the operations of these methods may be achieved by a processor reading and executing the programming instructions stored in the memory. In other examples, implementing the operations of the methods may be achieved using an ASIC and/or other hardware components either alone or in combination with programming instructions executable by a processor in a computing device or devices.

The example methods 200, 300 may include more than one implementation, and different implementations may not employ every operation presented in the respective flow diagram, or may employ additional steps not shown. Therefore, while the operations of methods 200, 300 are presented in a particular order within the flow diagram, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

Referring to FIG. 2, method 200 depicts an example, from a high-level perspective, of deploying a cloud resource tag recommendation engine. At 205 the tag recommendation engine discovers the resources, tags, and related data (e.g., all resource data relating to resources) in a deployed cloud, multi-cloud, or other networked computing environment. This discovery includes all relevant private clouds, public clouds, on-premise clouds, multi-clouds, hybrid clouds, and multi-provider clouds. The data is collected from any relevant cloud management platform, CMDB, or other database of relevant information such as an IT or human resource database.

At 210, a database or table(s) is generated based on the discovered resource information. In one example, the discovered resource data is separated into, or associated into, multiple categories or levels, such as a service design level and a subscription request level, or others business specific levels, to enable an option for a more focused tag recommendation model. At 215, machine learning is applied to the database of information to build a prediction model. In one example, the prediction model uses a regression technique to identify and recommend a tag that is standardized relative to tags already associated with the resources in the cloud, multi-cloud, multiple providers, hybrid cloud, and/or private cloud.

At 220, the tag recommendation engine recommends at least one tag for the resources at issue based on the prediction model. The recommendation is provided at a context-sensitive user-interface prompt for a user at a computing device. This recommendation allows the user, whether at the service design level or at the subscription request level or other business-relevant level, to select a tag that is consistent and standardized across the cloud resources. Note also that the entire process of discovering resource data 205, generating and updating the database 210, and applying machine learning to the data 215, is periodically performed—as indicated by the execution return control flow arrow 225—so that recommending tags for the resources is dynamically updated for consistent, standardized, relevant tagging of the resources at appropriate user-interface prompts.

FIG. 3 depicts an example method 300 for deploying a tag recommendation engine for providing consistent tagging strategies of cloud resources in any networked computing environment, including a local area network (LAN), wide area network (WAN), cloud, multi-cloud, multi-provider clouds, on-premise private cloud, hybrid cloud, or any combination of these.

At 305, all cloud resources, tags, and related data in a cloud 130 are discovered. The data is collected from CMDB 160, cloud management platform 165, or other database of relevant resource related information. Example data or data fields to be discovered may include, for example: cloud provider, cloud identification, on-premise cloud, hybrid cloud, region if on cloud, resource identification, operating system, database, business category (e.g., development, production), application, subscription identification, subscription name, subscription owner, subscription owner group, cost center, criticality, etc.

Figure 4:
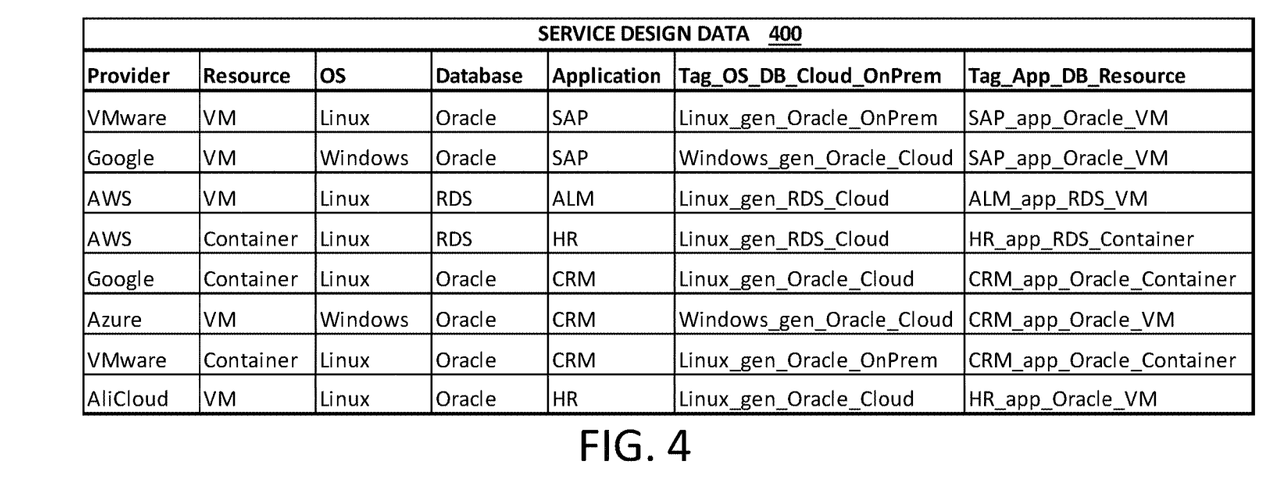
FIG. 4 is an example data table representing example service design data collected for use in a tag recommendation engine.
Figure 5:
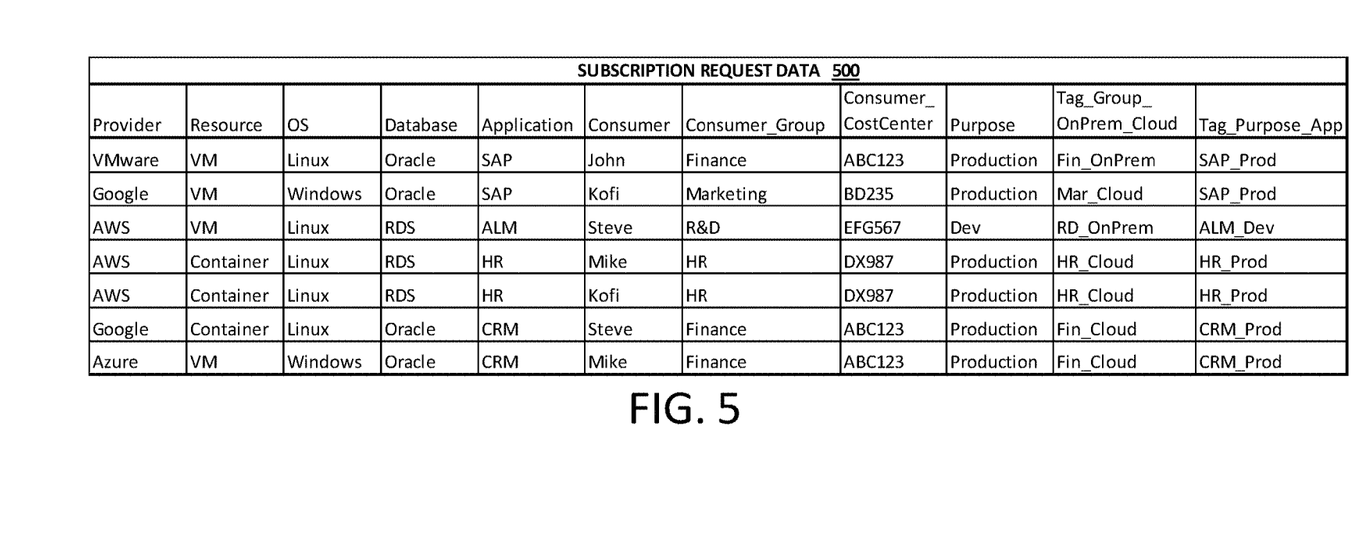
FIG. 5 is an example data table representing example subscription request data collected for use in a tag recommendation engine.

At 310, in this example the discovered data is separated into, or associated into, two categories or levels—a service design level and a subscription request level—in order to process the data separately 315 and enable a more focused tag recommendation model. Although two category levels are deployed in this example, additional levels may similarly be deployed to satisfy any particular business needs. At 320, the service design level data is stored into a database or table for subsequent processing. FIG. 4 depicts an example data table 400 representing example service design level resource data collected regarding cloud resources. Similarly, at 335, the subscription request level data is stored into a database or table for subsequent processing. FIG. 5 depicts an example data table 500 representing example subscription request level data collected regarding cloud resources and subscriptions.

At 325, machine learning is applied to the service design data table 400 of service design level information to build a prediction model for recommending resource tags at a resource design level. At 340, machine learning is applied to the subscription request data table 500 of subscription request level information to build a prediction model for recommending resource tags at a subscription request level. In one example, each prediction model uses a regression technique to identify and recommend a tag that is standardized relative to tags already associated with the resources.

For example, a regression technique such as random forest with decision tree may be used to build the model. Similarly, a principal component analysis (PCA) like K-means clustering may also be used. Either model may be used provided it manages multi-label classification because there are multiple target variables at issue.

At 330, at least one tag is recommended, based on the prediction model, for the resources discovered 400 at the service design level. At 345, at least one tag is recommended, based on the prediction model, for the resources discovered 500 at the subscription request level. The recommendation is provided at a context-sensitive user-interface prompt (see FIGS. 6-8, prompts 600, 700, 800) for a user at a computing device (e.g., server, desktop computer, laptop computer, handheld device, mobile computing device) that is communicating with or executing the tag recommendation engine. This allows the user, whether at the service design level or at the subscription request level, or any other level if implemented, to select a tag that is consistent and standardized across the cloud resources. Note that the entire process of discovering resource data 305, associating discovered data into service design and subscription request levels 310, 315, generating and updating the database tables 320, 335, and applying machine learning to the data 325, 340, is periodically performed—as indicated by the execution return control flow arrow 350—so that recommending tags for the resources 330, 345 is dynamically updated for consistent, standardized, relevant tagging of the resources at user-interface prompts.

Figure 6:
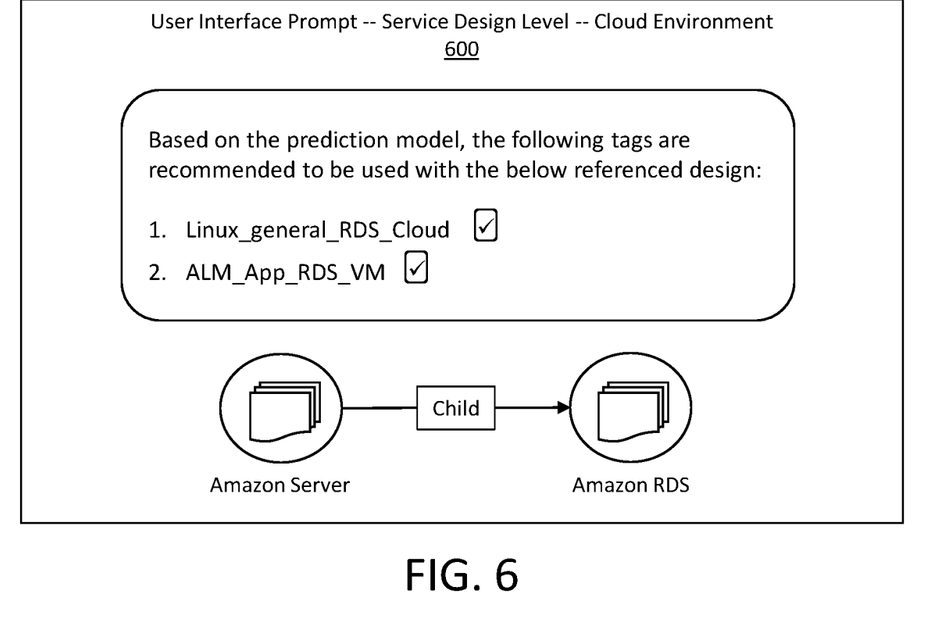
FIG. 6 is a block diagram illustrating an example user interface prompt on a computing platform at a cloud service design level for recommending tags.

FIG. 6 is a block diagram illustrating an example user interface prompt 600 for tag recommendation engine 105 (FIG. 1) to recommend tags on a computing device, such as server 185 (FIG. 1). Prompt 600 is an example prompt for recommending tags at a service design level in the context of a user designing resource configurations for potential subscriptions using a single cloud environment. Note in this example, based on tag recommendation engine 105 having already generated a service design data table 400 and executed the machine learning prediction model 180, two tags are recommended, e.g., Linus_general_RDS_Cloud, and ALM_App_RDS_VM, based on the example proposed service design of using an Amazon server and an Amazon Relational Database Service (RDS).

Figure 7:
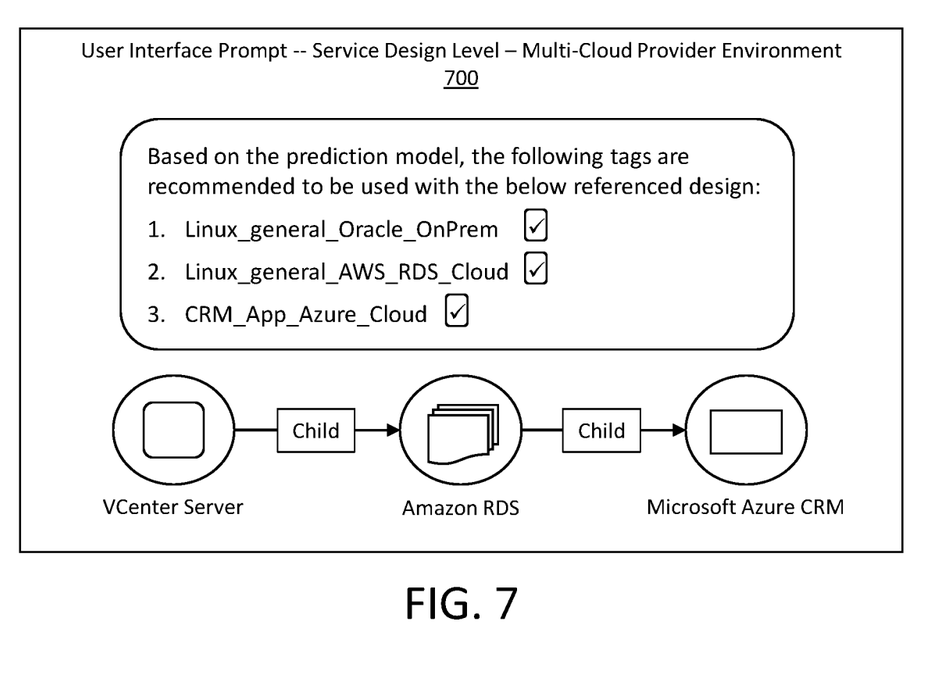
FIG. 7 is a block diagram illustrating an example user interface prompt on a computing platform at a cloud service design level using multiple cloud providers and on-premise resources for recommending tags.

FIG. 7 is a block diagram illustrating an example user interface prompt 700 for tag recommendation engine 105 (FIG. 1) to recommend tags on a computing device, such as server 185 (FIG. 1). Prompt 700 is an example prompt for recommending tags at a service design level in the context of a user designing resource configurations for potential subscriptions using multiple cloud providers and an on-premise cloud. Note in this example, based on tag recommendation engine 105 having already generated a service design data table 400 and executed the machine learning prediction model 180, three tags are recommended, e.g., Linux_general_Oracle_OnPrem, Linux_general_AWS_RDS_Could, and CRM_App_Asure_Cloud, based on the example service design of using a VMware VCenter server, an Amazon Relational Database Service (RDS), and a Microsoft Azure customer relationship management (CRM) application.

Figure 8:
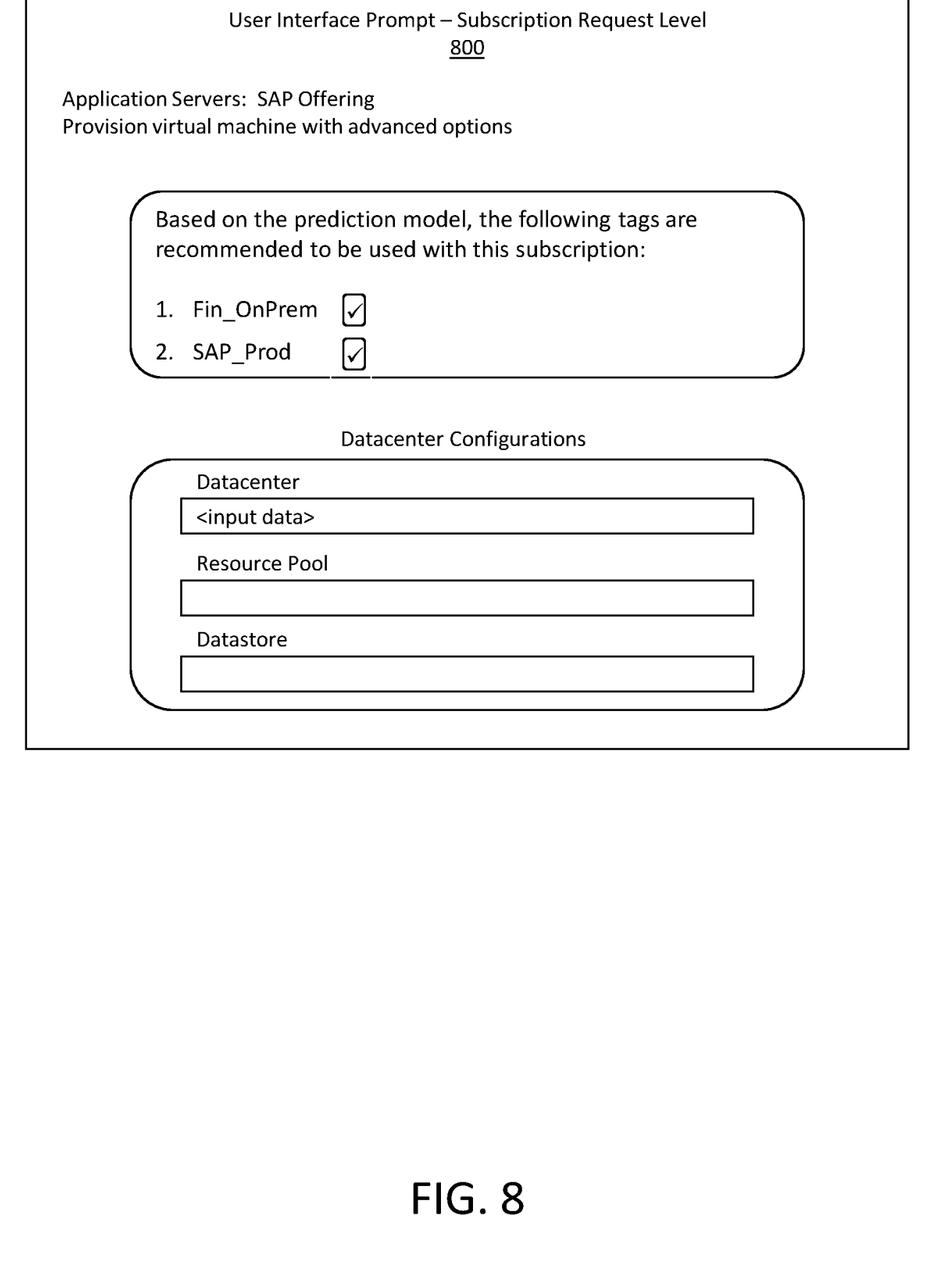
FIG. 8 is a block diagram illustrating an example user interface prompt on a computing platform at a cloud customer subscription request level for recommending tags.

FIG. 8 is a block diagram illustrating an example user interface prompt 800 for tag recommendation engine 105 (FIG. 1) to recommend tags on a computing device, such as server 185 (FIG. 1). Prompt 800 is an example prompt for recommend tags at a subscription request level in the context of a user/customer requesting a subscription to cloud services. Note in this example, based on tag recommendation engine 105 having already generated a subscription request data table 500 and executed the machine learning prediction model 180, two tags are recommended, e.g., Fin_OnPrem and SAP_Prod, responsive to various inputs detected such as a profile of the user (e.g., finance department, SAP application, production environment), and which type of cloud resources are available to that user (e.g., which resources were made available at the design service level, such as an on-premise cloud, and which resources were made available at the design service level for the finance department for production purposes).

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of managing a networked computing environment, comprising:
   discovering, by a device, resource data relating to resources in the networked computing environment;
   generating a database of information based on the resource data for each discovered resource;
   applying machine learning to the database of information to build a prediction model to recommend at least one tag for each discovered resource, wherein the at least one tag is standardized relative to tags associated with the resources across the networked computing environment; and
   recommending the at least one tag for each discovered resource.

2. The method of claim 1, wherein the networked computing environment comprises at least one of a public cloud, a private cloud, a hybrid cloud, a multi-cloud, a plurality of cloud providers, on-premise resources, virtual resources, or combinations thereof.

3. The method of claim 1, wherein the resources comprise at least one of a hardware device, a software application, a server, a computing system, a virtual machine, a container, a hypervisor, or combinations thereof.

4. The method of claim 1, wherein the resource data comprises information of at least one of a hardware resource, a software resource, an application, a computing system, a virtual machine, a container, a hypervisor, a resource tag, a resource service subscription, a resource used in the resource service subscription, a user profile data, a business profile data, or combinations thereof.

5. The method of claim 1, wherein the generating the database of information comprises associating the resource data into a plurality of usage levels for the resources in the networked computing environment.

6. The method of claim 5, wherein the applying machine learning to the database of information comprises applying the machine learning separately to the resource data associated at each of the plurality of usage levels.

7. The method of claim 1, wherein the generating the database of information comprises associating the resource data into at least one of a service design level or a subscription request level for the resources in the networked computing environment.

8. The method of claim 7, wherein the applying machine learning to the database of information comprises applying the machine learning to the resource data associated in at least one of the service design level or the subscription request level.

9. The method of claim 1, wherein the applying machine learning to the database of information comprises applying a regression technique.

10. The method of claim 1, wherein recommending the at least one tag for the resources comprises recommending the at least one tag in a context-sensitive user-interface prompt for a user of the networked computing environment.

11. The method of claim 1, wherein recommending the at least one tag for the resources comprises recommending the at least one tag relevant to at least one of a service design level for the resources or a service subscription request level for the resources.

12. The method of claim 1, wherein recommending the at least one tag for the resources based on the prediction model comprises information specific to at least one of a service design, a resource service subscription, a resource used in the resource service subscription, a user profile data, a business profile data, or combinations thereof.

13. The method of claim 1, further comprising periodically performing the discovering the resource data, generating the database of information, and applying machine learning, whereby recommending the at least one tag for the resources is dynamically updated for relevant tagging of the resources.

14. The method of claim 1, wherein the at least one tag for each discovered resource is filtered based on a user profile.

15. A system for managing a networked computing environment, comprising at least one processor and instructions that when executed by the at least one processor cause the at least one processor to:
    discover resource data relating to resources in the networked computing environment;
    generate a database of information based on the resource data for each discovered resource in the networked computing environment;
    apply machine learning to the database of information to build a prediction model to recommend at least one tag for each discovered resource, wherein the at least one tag is standardized relative to tags associated with the resources across the networked computing environment; and
    recommend the at least one tag for each discovered resource.

16. The system of claim 15, wherein the networked computing environment comprises at least one of a public cloud, a private cloud, a hybrid cloud, a multi-cloud, a plurality of cloud providers, on-premise resources, virtual resources, or combinations thereof.

17. The system of claim 15, wherein the instructions to generate the database of information comprises instructions to associate the resource data into a plurality of usage levels for the resources in the networked computing environment.

18. The system of claim 17, wherein the instructions to apply machine learning to the database of information comprises instructions to apply the machine learning separately to the resource data associated at each of the plurality of usage levels.

19. The system of claim 15, wherein the instructions to recommend the at least one tag for the resources comprises instructions to recommend the at least one tag in a context-sensitive user-interface prompt for a user of the networked computing environment.

20. A non-transitory machine-readable storage medium storing instructions that when executed by at least one processor cause the at least one processor to:
- discover resource data relating to resources in a networked computing environment;
- generate a database of information based on the resource data for each discovered resource;
- apply machine learning to the database of information to build a prediction model to recommend at least one tag for each discovered resource, wherein the at least one tag is standardized relative to tags associated with the resources across the networked computing environment; and
- recommend the at least one tag for each discovered resource.

* * * * *